United States Patent [19]

Addeo

[11] 4,029,900
[45] June 14, 1977

[54] DIGITAL SYNCHRONIZING SIGNAL RECOVERY CIRCUITS FOR A DATA RECEIVER

[75] Inventor: Eric John Addeo, Long Valley, N.J.

[73] Assignee: Bell Telephone Laboratories, Incorporated, Murray Hill, N.J.

[22] Filed: Jan. 26, 1976

[21] Appl. No.: 652,170

[52] U.S. Cl. .............................. 178/69.1; 328/155; 325/322
[51] Int. Cl.² .......................................... H04L 7/00
[58] Field of Search ...................... 178/69.5 R, 69.1; 328/72, 73, 75, 133, 134, 155; 329/122; 340/146.1 D; 235/150.3, 181; 325/421, 322, 323; 331/1 A

[56] References Cited

UNITED STATES PATENTS

| | | | |
|---|---|---|---|
| 3,209,265 | 9/1965 | Baker et al. | 328/63 |
| 3,228,688 | 6/1967 | Brooks | 324/83 |
| 3,286,176 | 11/1966 | Birnboim | 324/83 |
| 3,286,188 | 11/1966 | Castellano, Jr. | 329/122 |
| 3,329,895 | 7/1967 | Lenz | 324/83 |
| 3,351,868 | 11/1967 | Farrow | 331/17 |
| 3,626,311 | 12/1971 | Kraybill | 329/122 |
| 3,629,736 | 12/1971 | Hirsch et al. | 331/18 |
| 3,688,202 | 8/1972 | Naubereit et al. | 328/134 X |
| 3,764,902 | 10/1973 | Rodine | 324/83 |
| 3,806,664 | 4/1974 | Bowen et al. | 179/84 |
| 3,820,022 | 6/1974 | Watt | 324/83 |
| 3,889,186 | 6/1975 | Larson | 324/83 |
| 3,898,390 | 8/1975 | Wells et al. | 179/41 |
| 3,903,482 | 9/1975 | Pausini et al. | 331/17 |
| 3,920,900 | 11/1975 | Fineman | 178/69.5 R |
| 3,949,296 | 4/1976 | McClaskey et al. | 325/421 |
| 3,983,498 | 9/1976 | Malek | 328/155 |

OTHER PUBLICATIONS

High Capacity Mobile Tel System Rept., (filed in FCC Docket 18262), Dec. 1971, pp. 3–28.
Pulse, Digital and Switching Waveforms; J. Millman and H. T. Taub, 1965, pp. 726–728.
Richards, R. K., Electronic Digital Systems, 1966, pp. 424–429.
Bennett, W. R., & Davey, J. R., "Data Transmission", 1963, pp. 260–266.

*Primary Examiner*—Benedict V. Safourek
*Attorney, Agent, or Firm*—Charles Scott Phelan

[57] ABSTRACT

A data signal stream includes, in a noisy signal channel, periodic word synchronization characters, and each such stream is preceded by a burst of predetermined bit rate information. An approximate bit rate timing signal is derived from the data stream and utilized for producing an initialization pulse when the predetermined bit rate information is detected. In addition, the approximate bit rate timing signal drives a digital phase-locked loop which is preset by the initialization pulse to a digital circuit state defining operation at the nominal frequency of the approximate bit rate timing signal. A stable bit clock signal provided by the phase-locked loop controls the operation of further circuits which are responsive to the baseband data stream for providing an indicator pulse each time that a synchronizing character appears in the data stream. The bit rate clock and the character indicator pulses are employed to operate a timing chain that yields word synchronization pulses in synchronism with the indicator pulses and having an extraordinarily low false-pulse rate as well as evidencing a flywheel effect to maintain word synchronization in the event that a small number of character indicating pulses are missed. If more such pulses are missed, the timing chain is resynchronized.

25 Claims, 9 Drawing Figures

DIGITAL SYNCHRONIZING SIGNAL RECOVERY CIRCUITS FOR A DATA RECEIVER

BACKGROUND OF THE INVENTION

1. Field of the Invention

This invention relates to a synchronizing signal recovery circuit, and it relates particularly to such a circuit which is useful for extremely noisy data signal channels such as are found in some mobile radiotelephone systems.

2. Description of the Prior Art

Prior mobile radiotelephone systems generally assign a channel for a particular call connection, and that same radio channel is utilized throughout the call even though the radio portion of the call connection may be completed through different base stations as a mobile unit moves from one place to another within a given mobile service area. The system operates on a noisy radio channel; but a low data communication rate, e.g., up to a few hundred hertz, for controlling the radio call connection is usually adequate to handle the necessary data communication since there is relatively low data communication volume. In addition there is ample time available to recover synchronizing signals by state of the art techniques, which will be hereinafter further considered.

In newer high-capacity radiotelephone systems, a small-cell configuration is employed in which a given set of channels can be simultaneously reused many times in a single urban mobile service area by properly proportioning radiated signal powers in relation to cell size and by handing off a mobile unit from channel to channel as it moves from cell to cell in the mobile service area. Such systems are described in a number of source publications; and several examples include U.S. Pat. Nos. 3,663,762 to A. E. Joel, Jr., and 3,819,872 to H. E. Hamrick, and "High Capacity Mobile Telephone System - Technical Report" of December 1971, prepared by Bell Laboratories, and filed with the Federal Communications Commission in the same year under Docket 18262. Copies of the latter report may be currently purchased from Downtown Copy Center, 1730 K Street, N.W., Washington, D. C. 20006.

Details of such high capacity radiotelephone systems are not essential to an understanding of the present invention beyond a comprehension that such systems work on noisy Rayleigh fading channels and require a high data transmission bit rate in order to effect mobile unit location and handoff between channels on a real time basis. Such operation must be carried out without significantly disturbing subscribers who are active on a call connection. In addition, the indicated type of operation is necessary to realize the advantage of relatively high traffic capacity in terms of numbers of simultaneously operative call connections with a relatively few frequency channels, as compared to prior mobile radiotelephone systems which are incapable of simultaneously reusing frequency channels within a single mobile service area. In one such high capacity mobile radiotelephone system, paging channels include continuous data transmission from base stations at a 10-kilobit per second rate that is extremely stable. Noise on the radio channels gives the data the appearance of instability. During communication on voice channels, data is sent to an individual mobile unit by briefly blanking voice transmission and sending a burst of 10-kilobit per second data during the blanking interval, which interval is so short that the subscriber hears only a click.

Substantial difficulty is encountered in mobile units in high-capacity, small-cell systems of the type described in recovering synchronizing signals from the received data signals in order that the received data may be utilized by the mobile unit controller. These difficulties arise because, for example, the noise, including Rayleigh fading, is so severe that there is substantial jitter in leading and trailing edges of data pulses and data bits are frequently severely broken so that, in terms of signal transitions, a single data bit may appear as several bits. Rayleigh fading is experienced in a moving mobile unit and is signal variation due to addition and cancellation of reflected waves. Such fading occurs at intervals as low as 7 to 14 inches at 850 MHz in the frequency band in which the mentioned high-capacity, small-cell system is currently designed to operate. In such a noisy signal environment it is difficult to extract bit and word synchronizing signals in any event. It is particularly difficult to do it with the high speed that is required to respond to the data on a real time basis to hold synchronization without causing intolerably high data error rates and to perform all of this on an economical basis so that the cost of mobile units is not so high as to discourage the use of the high-capacity small-cell radiotelephone technique.

One example of a problem encountered in recovering bit synchronization signals lies in the fact that analog phase-locked loops, which are frequently employed for this purpose in prior art systems, suffer a substantial conflict in their operating characteristics. Thus, a narrowband type of operation is necessary to limit the range of signal frequencies to which the circuit can lock in order to reduce the likelihood that it will lock onto noise frequency signals. However, another characteristic of phase-locked loops is that it is advantageous for them to have fast pull-in response so that they can be quickly initialized. The fast pull-in is usually not available in narrowband phase-locked loops because the narrower the band of the operation the slower is the pull-in operation. In addition to the aforementioned conflict, temperature conditions experienced by a mobile unit can vary widely, and phase-locked loops are notoriously sensitive to temperature variations. Some of the best commercially available phase-locked loops exhibit a temperature dependent sensitivity of only about 250 parts per million per degree Centigrade. Such a characteristic will cause the free-running voltage controlled oscillator of the loop in a mobile radio environment to drift as far away as 250 Hertz or more from the nominal frequency. This in turn forces the designer to adjust the noise bandwidth to be much wider than the acceptable value needed to cope with the high noise condition on the channel. In other words, the phase-locked loop must be designed to capture over at least the range that can be spanned for its temperature sensitivity; but then the loop responds to a correspondingly wide noise bandwidth and exhibits excessive jitter.

On the question of recovering word synchronizing signals, mobile units experience all of the problems of bit synchronizing signal recovery as well as experiencing additional recovery problems. For example, the possible presence of voice and/or noise in the received signal at the mobile unit causes a high probability that a false synchronizing character will be generated. Consequently, prior art circuits that simply recognize such a character are usually inadequate to operate in this noisy environment and can permit intolerably high rates of false synchronization with the consequent loss of data.

SUMMARY OF THE INVENTION

The burden of the foregoing problems in connection with prior art synchronization signal recovery circuits is reduced in an illustrative embodiment of the present invention in which synchronizing characters in a data stream are detected and the resulting character indicating signals are utilized in conjunction with a stable bit clock signal to generate word synchronizing signals only after at least two bit rate clock pulses and synchronizing character indicators have been detected in coincidence.

Other advantageous aspects of the present invention include the employment of a digital phase-locked loop circuit that is initialized upon the detection of a data message introductory character and that thereafter locks in response to an approximate bit rate timing signal derived from the data signal bit stream. This digital phase-locked loop produces a stable bit rate clock for use by the word synchronizing circuits. In the latter circuits, a timing chain counts down the stable bit clock to provide word synchronizing rate pulses which are used for output word synchronizing signals. The timing chain is forced to an initial count state by a first coincidence of a synchronizing character with a stable bit clock pulse and produces a word synchronizing rate pulse at one word synchronizing interval after such coincidence. If the latter pulse coincides with another synchronizing character indicating pulse and a bit clock pulse, the forcing of the timing chain to an initial count state is inhibited until such time as the loss of at least a predetermined number of plural successive synchronizing character indicators is detected.

BRIEF DESCRIPTION OF THE DRAWING

A more complete understanding of the invention and its various features, objects, and advantages may be obtained from a consideration of the following detailed description in connection with the appended claims and the attached drawing in which:

DETAILED DESCRIPTION

Figure 1:
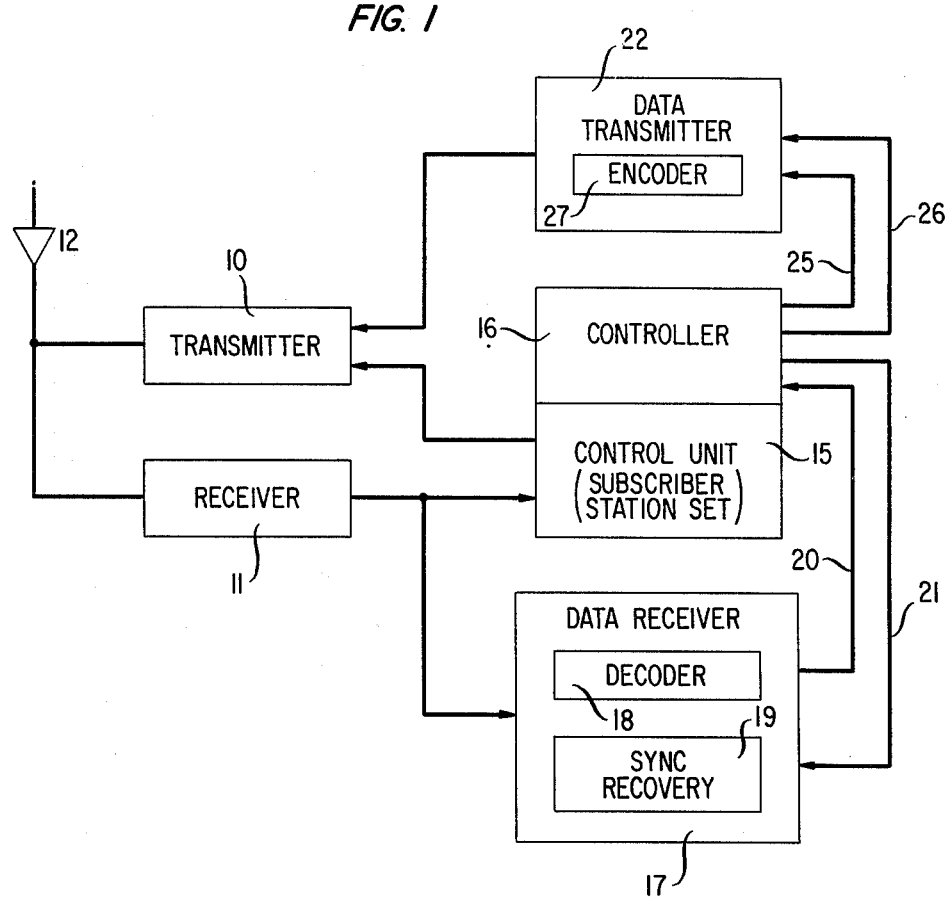
FIG. 1 is a simplified diagram of a mobile radiotelephone unit in which the present invention is useful.

In the FIG. 1 simplified diagram of a radiotelephone mobile unit, a transmitter 10 and a receiver 11 provide coupling between an antenna 12 and a subscriber's control unit, or station set, 15 for accomplishing the basic radio communication between the subscriber and a base station, not shown. Through that radio link connection is made to a land line for communicating to a mobile telecommunication switching office, not shown, for interfacing with the public telephone communication network.

A controller 16 receives and transmits data messages with respect to the base station for guidance in its exercise of control of other equipment in the mobile unit. Specific paths for this control are shown for only a data transmitter and a data receiver. This controller is advantageously a stored program controller of a type now familiar in the art.

A data receiver 17 receives baseband data signals from the output of a discriminator in the receiver 11. These signals are advantageously in the so-called Manchester coding format in which a binary ONE signal bit is represented by a positive-going signal excursion followed by a negative-going excursion; and a binary ZERO signal bit is represented by a negative-going excursion followed by a positive-going excursion. A decoder 18 reduces the received data signals to a non-return-to-zero (NRZ) format with the aid of timing information provided by a synchronizing signal recovery circuit 19; and such NRZ data signals are coupled over a signal path 20 to the controller 16 for use in the manner just outlined. In addition, a signal path 21 extends from the controller to the data receiver 17 for supplying control signals occasionally needed by the receiver in connection with carrying out the stored program control of the overall mobile unit. For example, controller 16 advantageously supplies, over the path 21, control signals to be used by the synchronizing signal recovery circuit 19 for reinitiating synchronization when required by the mobile unit program of operation. In addition, the controller provides signals which advise the synchronizing signal recovery circuit 19 whether the mobile unit is in a continuous data transmission mode, such as a mobile unit experiences when it is tuned to a paging channel or in a blank and burst mode, such as is experienced by a mobile unit when a data message is transmitted as a data burst during a brief interval of voice signal blanking on a voice communication channel.

The mobile unit of FIG. 1 also includes a data transmitter 22 which receives data messages on path 25 from controller 16 for encoding in the Manchester code format and coupling to the transmitter 10 to be sent to the base station. In addition, a signal path 26 is provided for coupling additional control signals from the controller 16 to influence the operation of the data transmitter 22. In the transmitter a Manchester encoder 27 accomplishes the encoding function.

Figure 2:
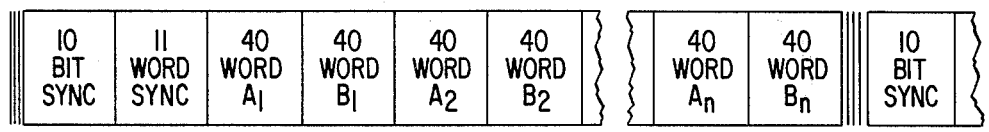
FIG. 2 is a diagram of a typical data message receivable by the mobile unit in FIG. 1.

FIG. 2 shows the typical information fields of a 10-kilobit per second data message stream of a type that is advantageously employed for sending data messages to the mobile unit in FIG. 1. This data stream, sometimes called a "forward setup channel message", includes, in the format illustrated, two time division channels otherwise designated as channel A and channel B. Words 1 through N on channel A are N repetitions of a message interleaved in a time division multiplex fashion with N repetitions of another message on the channel B. The number of bits advantageously included in each field of the message is indicated by Arabic numerals above that field in FIG. 2. It is there apparent that each time division multiplexed word includes forty bits; and the plural word message is preceded by 10-bit field for bit synchronization, and an 11-bit field for word synchronization. In a blank and burst data message set to a particular mobile unit, the message format is modified somewhat from that shown in FIG. 2. The A and B multiplexed channels would not be used, the bit synchronization field would be much longer, and both the bit and word synchronization fields would precede each repetition of the message word to the single mobile unit.

In the bit synchronization field of the word in FIG. 2, the format of the information is typically alternate binary ONE and ZERO bits in a recurrent sequence sometimes called a dotting sequence. Thus, the dotting sequence in a 10-kilobit per second data bit stream in either the Manchester or the NRZ format has a strong 5-kilohertz component; and this factor is employed to advantage as will be subsequently described.

The 11-bit word synchronizing field employs a predetermined bit sequence, e.g., a so-called Barker sequence, which is unlikely to occur in a data message and which has a low probability of being simulated in a voice message. Nevertheless, false word synchronizing sequences can appear occasionally in a data stream or in a voice signal stream, either with or without the contribution of spurious noise, and thereby give the false appearance of a synchronizing character. The synchronizing signal recovery circuits to be hereinafter described include arrangements for greatly reducing the impact of such false appearances.

Figure 3:
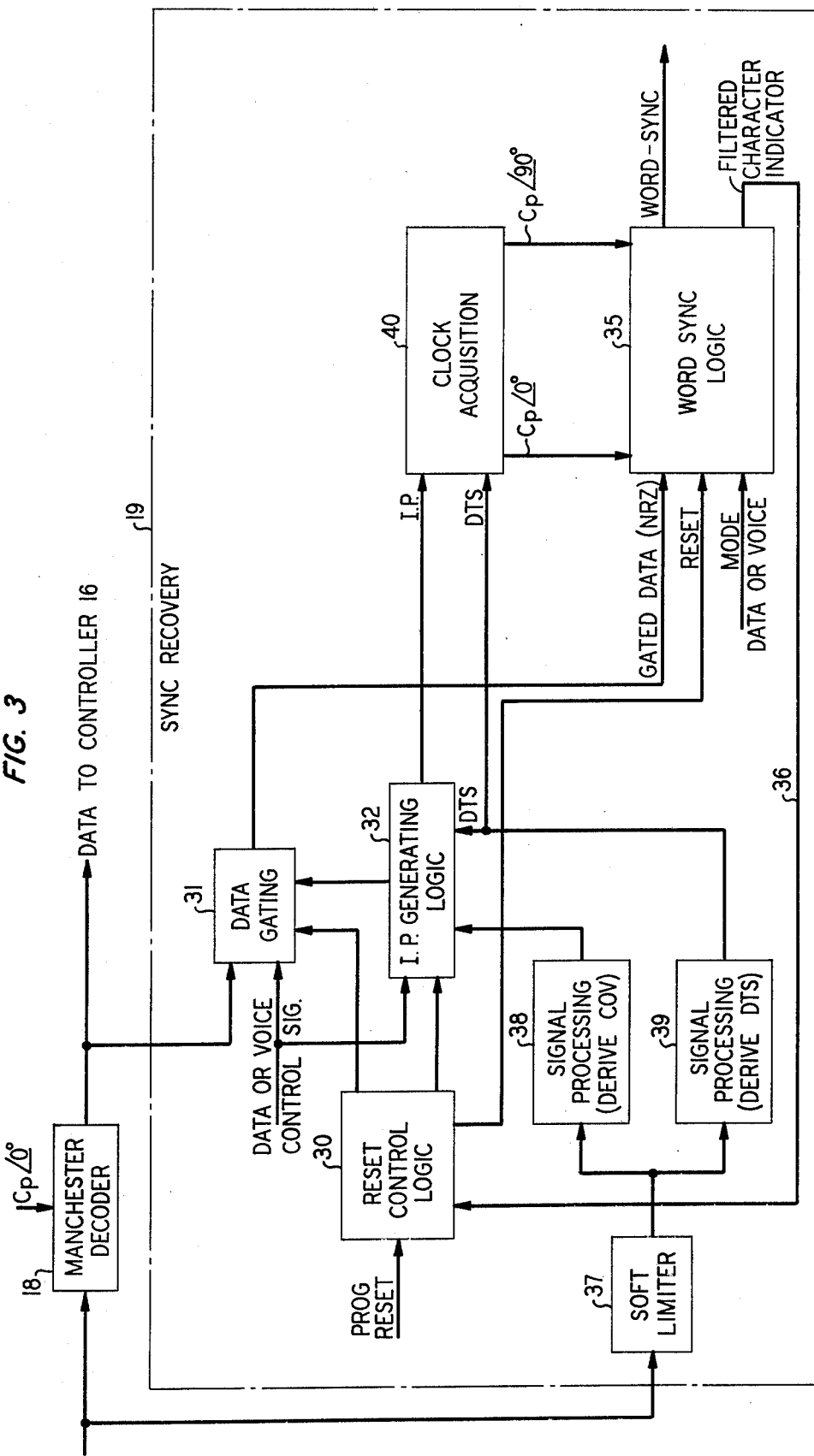
FIG. 3 is a simplified functional diagram of the synchronizing signal recovery circuit indicated in the FIG. 1 mobile unit.

In FIG. 3 data messages from the receiver 11 in FIG. 1 are applied to the Manchester decoder 18 for decoding and further coupling to the controller 16 and to the synchronizing signal recovery circuit 19, as described in connection with FIG. 1. Decoders for translating the Manchester encoded data to the NRZ data format are well known in the art and details thereof comprise no part of the present invention. It is sufficient here to point out that in one prior art decoding algorithm the derived symbol clock, produced in a manner which will be hereinafter described, is utilized to control the operation of logic circuits which convert the Manchester format to a form like the NRZ format but which includes substantial noise received with the Manchester format as is evidenced e.g. by substantial leading and trailing edge jitter. In this form, the data is coupled through an integrate and dump circuit operating at the bit rate and which integrates the noisy NRZ form of the data to produce a waveform which is then sampled near the end of each bit interval and employed to control a data sampler that supplies an essentially noise-free NRZ form of the data except that it still includes substantial phase jitter.

FIG. 3 includes a simplified functional diagram of the synchronizing signal recovery circuit 19 which will be considered first to facilitate an understanding of circuit details to be subsequently discussed. When power is applied to the mobile unit, it actuates reset control logic 30 which provides reset signals for initializing a data gating circuit 31 which permits the NRZ data from the Manchester decoder 18 to be utilized in the synchronizing signal recovery circuit 19 only during continuous data reception on a paging channel and during the initial part of a data burst on a voice channel. The reset control logic 30 also resets initialization pulse generating logic 32 to facilitate the synchronizing signal recovery operation at the beginning of a data stream. In addition, the logic 30 provides a reset signal to word synchronizing logic 35 for initializing a synchronizing character detector included therein. Upon the detection of such a character in the logic 35, a filtered character indicating pulse is coupled back on lead 36 to restore the reset control logic 30 to its normal condition for signal processing. Subsequently during normal stored program control of the mobile unit operation, controller 16 in FIG. 1 from time to time provides a programmed reset signal which reactivates the reset control logic 30 to perform in the manner just described.

The Manchester coded data from the discriminator of the receiver 11 in FIG. 1 is also applied in FIG. 3 to a soft limiter 37 which has the effect of clipping spurious signal excursions without significantly steepening the leading and trailing edges of the baseband data signals. The purpose of this limiter operating in this fashion is to remove some of the noise components from the baseband data signal.

A signal processing circuit 38 responds to the limited baseband data for deriving a direct current level sgnal COV which indicates that a baseband signal sequence corresponding to a dotting sequence has been received. This function is provided to reduce the chances that the synchronizing signal recovery circuits will work futilely on voice signals. The COV output level is high in the absence of the dotting sequence and low in the presence of that sequence. This signal is utilized to enable the operation of the initialization pulse generating logic 32.

Another signal processing circuit 39 also responds to the limited baseband data from limiter 37 for deriving a timing signal (DTS). This circuit includes band-limiting functions and a zero crossing detector, as will be more fully described, to facilitate the determination of a 5-kilohertz component in the baseband data signal. Although the derived timing signal still has substantial jitter and noise breaks, of the types which were included in the baseband data signal as received, it is nevertheless an approximate timing signal which is useful in further synchronizing signal recovery operations. The DTS signal is coupled to the initialization pulse generating logic 32 and to a clock acquisition circuit 40 for use in generating the stable bit, or symbol, clock signal for use throughout the synchronizing signal recovery circuits 19 and throughout the rest of the mobile unit.

The initializing pulse generating logic 32 produces a pulse in response to each DTS pulse. However, after a certain number (two in the illustrative embodiment to be described), it stops the production of initialization pulses for a short time to enable the remainder of the synchronizing signal recovery circuit 19 to determine whether or not a synchronizing character has been adequately detected to assure both bit and word synchronization in a stable fashion. The initializing pulse generating logic recycles in the fashion just described until synchronization has been detected; and then the aforementioned character indicating output on lead 36 of word synchronizing logic 35 restores the reset control logic 30, thereby inhibiting further operation of the initialization pulse generating logic 32 and fully enabling the data gating circuit 31. Initialization pulses (IP) from the logic 32 are utilized along with the DTS signal from the processing circuit 39 in the clock acquisition circuit 40.

A digital phase-locked loop is advantageously utilized in the clock acquisition circuit 40 for producing a stable bit clock signal at the 10-kilohertz rate at two different phase angles and in true and complement forms of each. The initialization pulses from the logic 32 preset the digital phase-locked loop in clock acquisition circuit 40 so that its digital circuits are in a state corresponding to operation that produces a stable bit rate clock signal of the bit frequency of the incoming baseband data signal from the receiver discriminator. This stable clock signal is produced in a predetermined phase relationship to the received baseband data information as determined by the fact that the initialization pulses are produced in response to the derived timing signal DTS which contains the phase information of the received baseband data. Following initialization, the digital phase-locked loop in clock acquisition circuit 40 operates to maintain phase lock to the DTS signal at its input with a high precision, and with a low sensitivity to temperature variations which is generally unrealizable by phase-locked loops otherwise presently available in the art.

Word synchronizing logic 35 operates under the control of stable bit clock signals from the clock acquisition circuit 40. It also receives the gated NRZ form of the baseband data signals coupled through the data gating circuits 31. When the mobile unit is operating in the continuous data mode, the NRZ signals are coupled through to logic 35 regardless of the state of the COV signal provided from processing circuit 38 to logic 32, and hence to data gating circuit 31. However, when the mobile unit is operating in the voice mode, the NRZ data is coupled through gating circuits 31 to logic 35 only if the COV signal is low, thereby indicating that a data burst is present. Logic 35 examines the gated data for synchronizing characters; and upon identification of at least two such characters, it restores the reset control logic as previously noted.

Word synchronizing logic 35 also includes circuits that generate word synchronizing rate pulses from the stable bit rate clock, and it forces those synchronizing rate pulses into step with detected synchronizing characters so that the synchronizing rate pulses can become word synchronizing pulses to be used by the controller 16 in FIG. 1. The term "word synchronizing rate" is herein used to mean the rate at which word synchronizing characters, as distinguished from data words per se, appear in the data stream. If a predetermined number (five in the illustrative embodiment here considered) of synchronizing character indicating pulses are missed, the word synchronizing logic 35 reinitializes itself with respect to the gated NRZ data and the stable bit clock. Of course, at any time the controller 16 might order a programmed reset of the synchronizing signal recovery circuits 19 by a pulse to the reset control logic 30 as already mentioned. When that occurs, the entire reinitializaton operation is again carried out with a new set of initialization pulses being produced as soon as the level signal COV has been found to be present.

Figure 7:
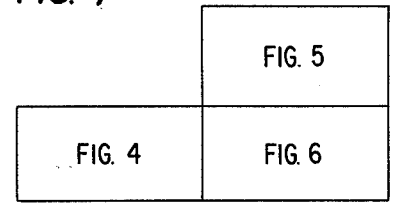
Figure 4:
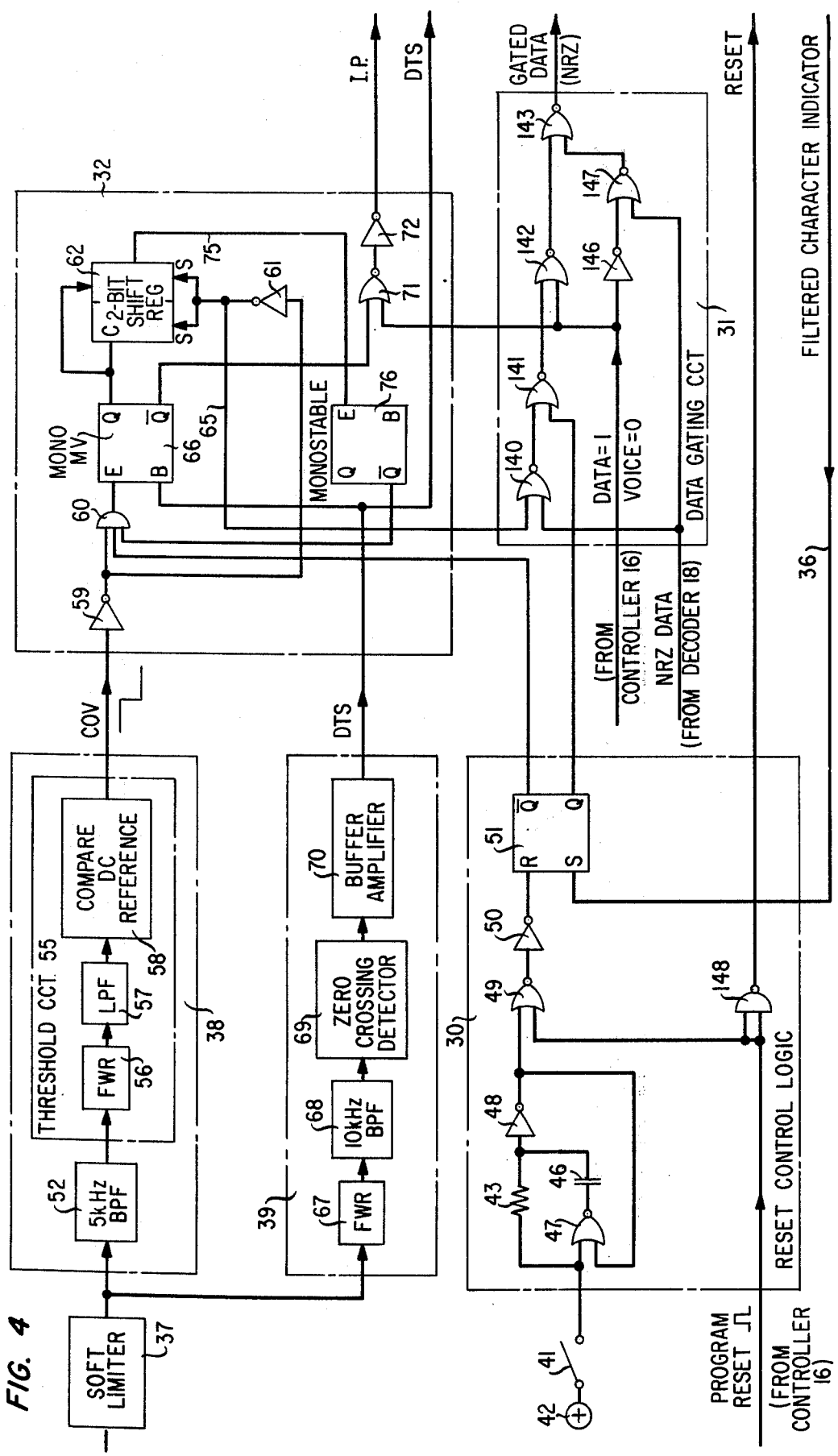
FIGS. 4 through 6, assembled as indicated in FIG. 7, comprise a more detailed diagram of the synchronizing signal recovery circuit of FIG. 3.
Figure 5:
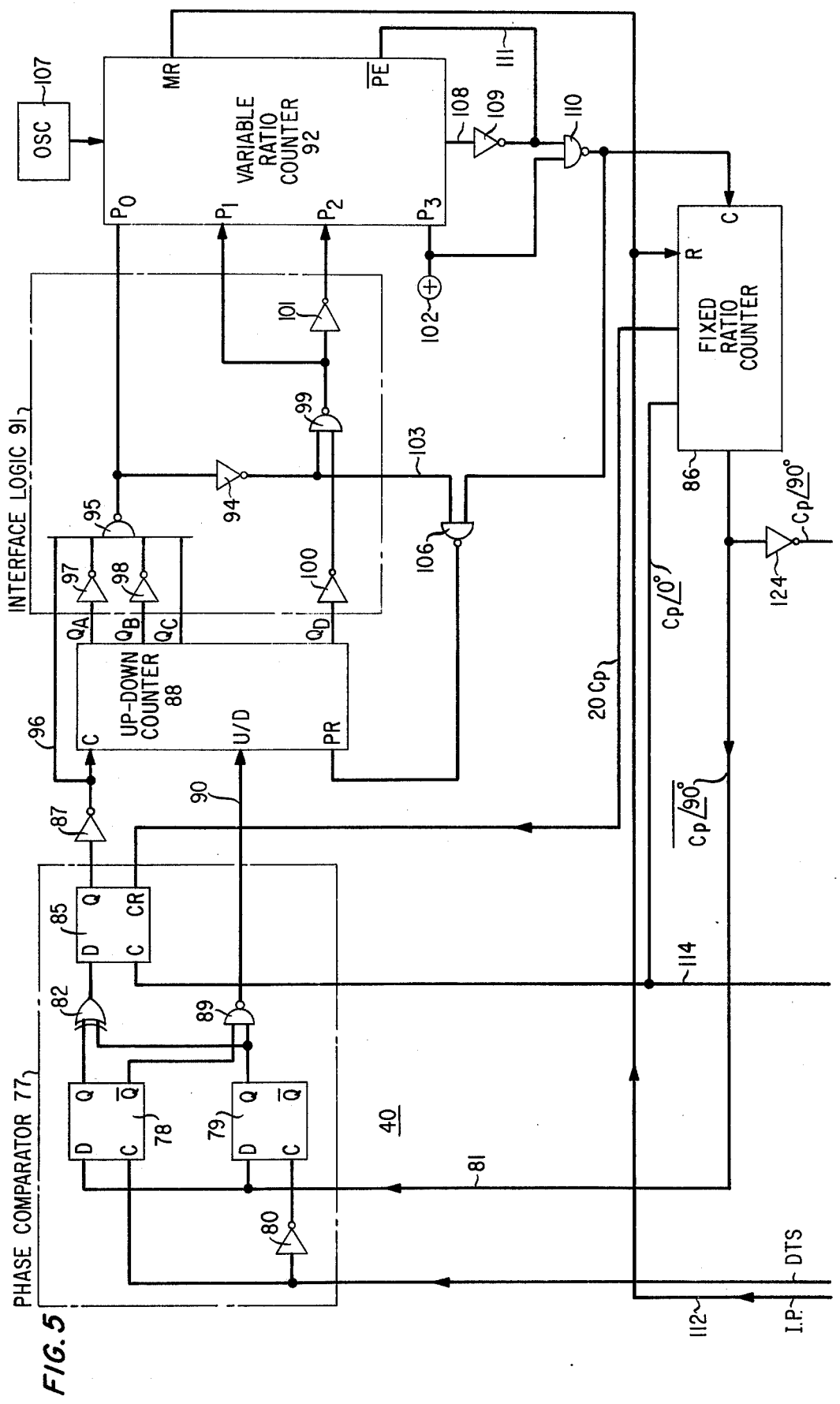
Figure 6:
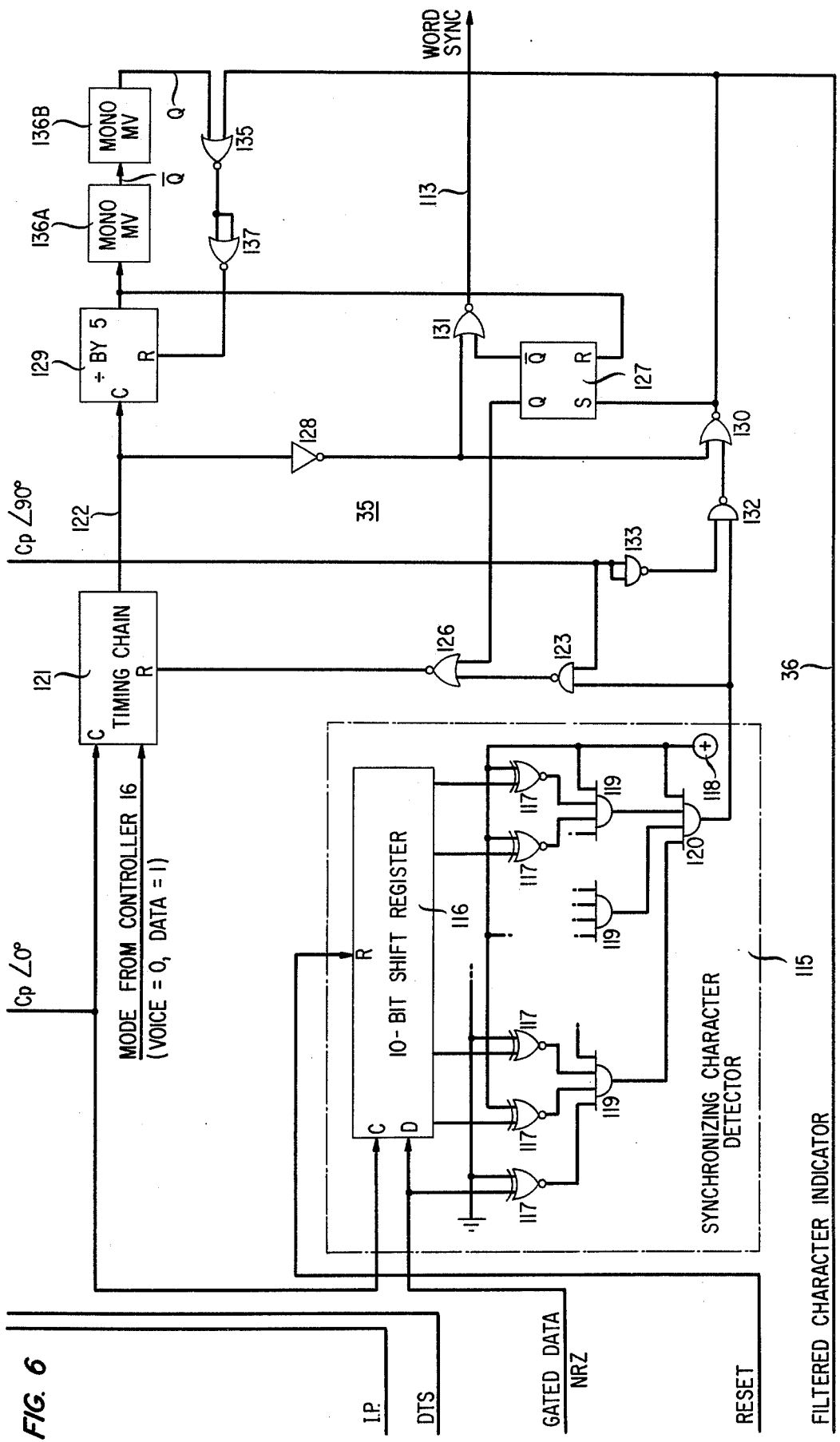

FIGS. 4, 5, and 6 comprise a composite diagram, when assembled as indicated in FIG. 7, partly in schematic form and partly in block and line diagram form, of the synchronizing signal recovery circuits 19 which were outlined in connection with FIG. 3.

Reset control logic 30 in FIG. 4 prepares the synchronizing signal recovery circuits for operation in the manner outlined either when power is applied by operation of a switch 41 to the switch closed position, or when a program reset pulse is supplied from the controller 16. In the case of the initial application of power to the circuits, the positive voltage from a grounded source 42 is coupled through a resistor 43 to charge a capacitor 46 through the output connections of a NOR gate 47 which is at that time blocked by virtue of the high input at one of its input connections from the source 42. When capacitor 46 begins to charge, the input signal to an inverter 48 is low so that it produces a high output signal which is fed back to another input of the NOR gate 47. This high output of inverter 48 forces a NOR gate 49 to produce a low output which is coupled by a further inverter 50 for providing a high signal to reset a bistable trigger circuit, such as the D flip-flop circuit 51. As capacitor 46 continues to charge, the output of inverter 48 goes low; and it, together with the normally low signal on the reset lead from controller 16, forces NOR gate 49 to produce a high output, thereby removing the high resetting signal from the D flip-flop 51. However, the NOR gate 49 is now enabled to respond to a positive reset pulse from controller 16 for providing a high reset signal to flip-flop circuit 51. Needless to say, the source 42 is merely a schematic representation of a power supply which operates all of the circuits of FIG. 4, but which is not specifically shown in most of the schematic indications in the figure.

When flip-flop circuit 51 has been reset, its high $\overline{Q}$ output partially enables an AND gate 60 in the initialization pulse generating logic 32. The low Q output extends to the data gating circuit 31 to enable a NOR gate there.

In the processing circuit 38 the limited baseband data signal is passed through a 5-kilohertz bandpass filter 52. This filter has its center frequency at 5 kilohertz, i.e., at one-half the baseband data bit rate; and it also has a relatively high Q=25 for the illustrative embodiment. Such a filter has an extremely narrow baseband and consequently excludes voice frequency signals below the center frequency and also excludes supervisory tones at around 6 kilohertz that are employed in a certain high capacity mobile radiotelephone system. Consequently, the output of filter 52 responds to the strong 5-kilohertz component in the 10-kilobit per second dotting sequence which introduces data messages.

Output from filter 52 is applied through a threshold circuit 55 which has a full-wave rectifier 56 as the input stage thereof. That rectifier, which advantageously is constructed from operational amplifiers and diodes in a manner well known in the art to avoid the use of transformers, restores the 10-kilohertz component to the signal from filter 52.

A low-pass filter 57 receives the output of full-wave rectifier 56 and operates thereon with a cutoff frequency at about 5 kilohertz so that the output of the filter 57 is a direct current signal at a level which is approximately equal to the average value of the 10-kilohertz output from the full-wave rectifier 56. This direct current signal from filter 57 is applied to a comparator 58 wherein it is compared to a voltage reference at a level which is predetermined to represent that which should be produced to indicate with acceptable accuracy the presence of the aforementioned dotting sequence in the baseband data signal. If the voltage from filter 57 is below that level, the comparator output is a high voltage; and if the filter voltage is above the reference level, the comparator output is at a low voltage to indicate the presence of a dotting sequence. This comparator output voltage is the aforementioned COV signal.

The COV signal is applied to the initialization pulse generating circuit 32 where it is coupled through an inverter 59 to provide an enabling, when COV is low, input signal to an AND gate 60. That AND gate has already been partially enabled by the high $\overline{Q}$ output of the flip-flop circuit 51 in the reset control logic 30 as previously described. The output of inverter 59 is also coupled through a further inverter 61 which has its output applied to setting input connections of the two stages of a 2-bit shift register 62. Thus, those stages are forced to the set condition when the COV signal is high, and they are therefore ready to begin operation when the generating circuit 32 begins its cycle. The low COV signal, coupled through inverters 59 and 61, does not disturb the set state of the shift register 62; but it is further coupled by a lead 65 to the data gating circuit 31 as an indication that the dotting sequence appears to have been detected. Since the AND gate 60 normally has a high signal on its third illustrated input connection, it is actuated in response to the low COV signal and provides a high output which enables a monostable multivibrator 66 for triggering later by the DTS signal.

The output of the soft limiter 37 is also applied, as already described, to the signal processing circuit 39. In that circuit a full-wave rectifier 67 produces an output which has the effect of doubling the principal frequency component in the signal from the soft limiter 37. During the dotting sequence that principal input frequency component is 5 kilohertz, as already mentioned; and the rectifier 67 produces an output with a 10-kilohertz component which is applied to a 10-kilohertz bandpass filter 68. An input 5-kilohertz bandpass filter is not employed in the processing circuit 39, as was done in the processing circuit 38, since in the latter circuit the principal concern was with the amplitude of a particular frequency component; and it was necessary to select that component precisely. However, in the processing circuit 39, amplitude is of less importance because the principal concern is with the phase information contained in the data signal; and for that purpose circuits 39 and 40 cooperate so circuit 39 does not need such careful frequency selection. The filter 68 has a 10-kilohertz center frequency, i.e., a center frequency at the bit rate of the baseband data signal. It also advantageously has a relatively low Q=10 so that it operates over a comparatively broadband. This arrangement permits an initial band limiting which is sufficient to allow the clock acquisition circuit 40 to complete determination of the stable bit clock. In addition, however, by operating the filter 68 as a relatively broadband filter, the temperature sensitivity of the filter's phase response is kept quite low so that there is no substantial phase variation in the DTS signal because of temperature variations around the filter 68. This is an important consideration since it is desirable to provide the phase information in the baseband data signal to the clock acquisition circuit 32 without significant mutilation.

A zero crossing detector 69 receives the output of filter 68 and, in effect, realizes a phase inversion and a substantial squaring of the signal waveform provided by the filter. A buffer amplifier 70 brings the output of the detector 69 up to a predetermined minimum level which it is desirable to have in the derived timing signal. That signal DTS is coupled to the initialization pulse generating circuit 32 for actuating the previously enabled monostable multivibrator 66, and it is also coupled to the clock acquisition circuit 40 for extraction of its phase information as will be described.

After the signal processing circuit 39 has responded in the manner just outlined to the dotting sequence at the beginning of a data message, it then receives more conventional data words which have random binary ONE and ZERO sequences. If a random sequence includes a series of binary ONEs or a sequence of binary ZEROs in the Manchester code format, the signal processing circuits 39 respond in essentially the same fashion as heretofore described to produce the DTS approximate timing signal. However, when less regular bit sequences are received, the strong 5-kilohertz component disappears along with the 10-kilohertz output of the full-wave rectifier 67. Consequently, the bandpass filter 68 produces a low output to the zero crossing detector and thereby disables its operation. As a result, the DTS approximate timing signal disappears until a further regular bit sequence, with a strong component at one-half the bit rate, appears again. Such intervals of no DTS are relatively short in terms of the operation of the clock acquisition circuit 40, since the data coding format is advantageously that typically used in commercial data transmission systems and which is designed to assure at least a minimum number of transitions between the binary ONE and ZERO signal states.

In the initialization pulse generating circuit 32, the actuated monostable multivibrator 66 produces on each actuation thereof a negative-going voltage pulse at the $\overline{Q}$ output. Those pulses are coupled to one input of a NOR gate 71 which is enabled by a high binary ONE signal from controller 16 when the mobile unit is in its data mode of operation. Positive-going output pulses from the NOR gate 71 are inverted by inverter 72 to produce negative-going initialization pulses on the respective actuations of monostable multivibrator 66.

In addition, the multivibrator 66 produces on each operation a high Q output which is applied to the clock input of the respective stages of the 2-bit shift register 62. That shift register advantageously includes two tandem-connected D flip-flop circuits with the first one thereof clocked from monostable multivibrator 66, as just outlined, and biased (by circuits not specifically shown) so that the first output pulse from monostable multivibrator 66 resets the first stage of shift register 62. That first stage clock input is removed before a resulting change in the output of the first stage can affect the second stage. The second output pulse from multivibrator 66 does not affect the first stage of the shift register 62 which has already been reset, as just outlined, but it allows the second stage to be reset by the output from the first stage and thereby produces a low shift register output on a lead 75 which is connected to an enabling input connection of a further monostable multivibrator 76. The latter multivibrator is biased by circuits, not shown, to trigger when it is enabled as just indicated. The resulting negative-going $\overline{Q}$ output disables the AND gate 60 for an interval which is long enough to allow the word synchronizing logic 35 to examine at least two work synchronizing intervals of the received data stream. Thus, the monostable multivibrator 66 recurrently produces a set of two initialization pulses spaced one bit interval apart, if there is no noise, and then waits for about two word synchronization times to see if synchronization has been achieved. If synchronization has not been achieved, monostable 76 will have reset; and the initialization pulse generating circuit 32 produces another set of two initialization pulses in the same fashion just described.

Consider now the clock acquisition circuit 40 in FIG. 5. This circuit receives initialization pulses and the DTS signal to produce therefrom stable bit clock signals in phase with the baseband data and in a 90° phase shifted form for use in the word synchronization logic 35 and in the Manchester decoder 18. The illustrated embodiment of circuit 40 is a digital phase-locked loop with a digital integrator (or accumulator) in the loop path.

The DTS signal is applied to the input of a phase comparator 77 and used in true form to clock a D-type flip-flop circuit 78 and in complement form to clock another D-type flip-flop circuit 79. The complement clock form is obtained by coupling the DTS signal through an inverter 80 to the latter flip-flop circuit. The D inputs to each of the flip-flop circuits 78 and 79 receive the phase-locked loop feedback signal on a lead 81 at the same (bit rate) frequency, i.e., the feedback is the stable bit clock $Cp$ in the complement of the 90° phase shifted form $\overline{Cp\ /90}$.

The Q outputs of flip-flop circuits 78 and 79 are coupled through an EXCLUSIVE OR gate 82 to provide a signal to the D input connection of a further D flip-flop circuit 85. That flip-flop circuit is clocked by the feedback bit rate signal $Cp\ /0$, and it is cleared at a much higher rate by a $20Cp$ signal from an early stage of a fixed ratio counting circuit 86 in the phase-locked loop feedback path. The Q output of this flip-flop circuit 85 takes the form of infrequent narrow pulses because the flip-flop circuit can be set only on the leading edge of a $Cp\ /0$ clock pulse, but it is almost immediately reset by a $20Cp$ clock pulse. The flip-flop cannot be set again until a new $Cp\ /0$ clock pulse occurs when the output of the EXCLUSIVE OR gate 82 is high. Output pulses from the phase comparator 77 and appearing at the Q output of flip-flop circuit 85 are coupled through an inverter 87 to the clock input of an updown binary counter 88. That counter operates as a digital integrator in the phase-locked loop path.

A NAND gate 89 receives at its two input connections the $\overline{Q}$ output of flip-flop circuit 78 and the Q output of flip-flop circuit 79. Output signals from NAND gate 89 are applied on a lead 90 to the direction control input of the reversible counter 88 as direct commands to be acted upon when the counter is clocked.

Figure 5A:
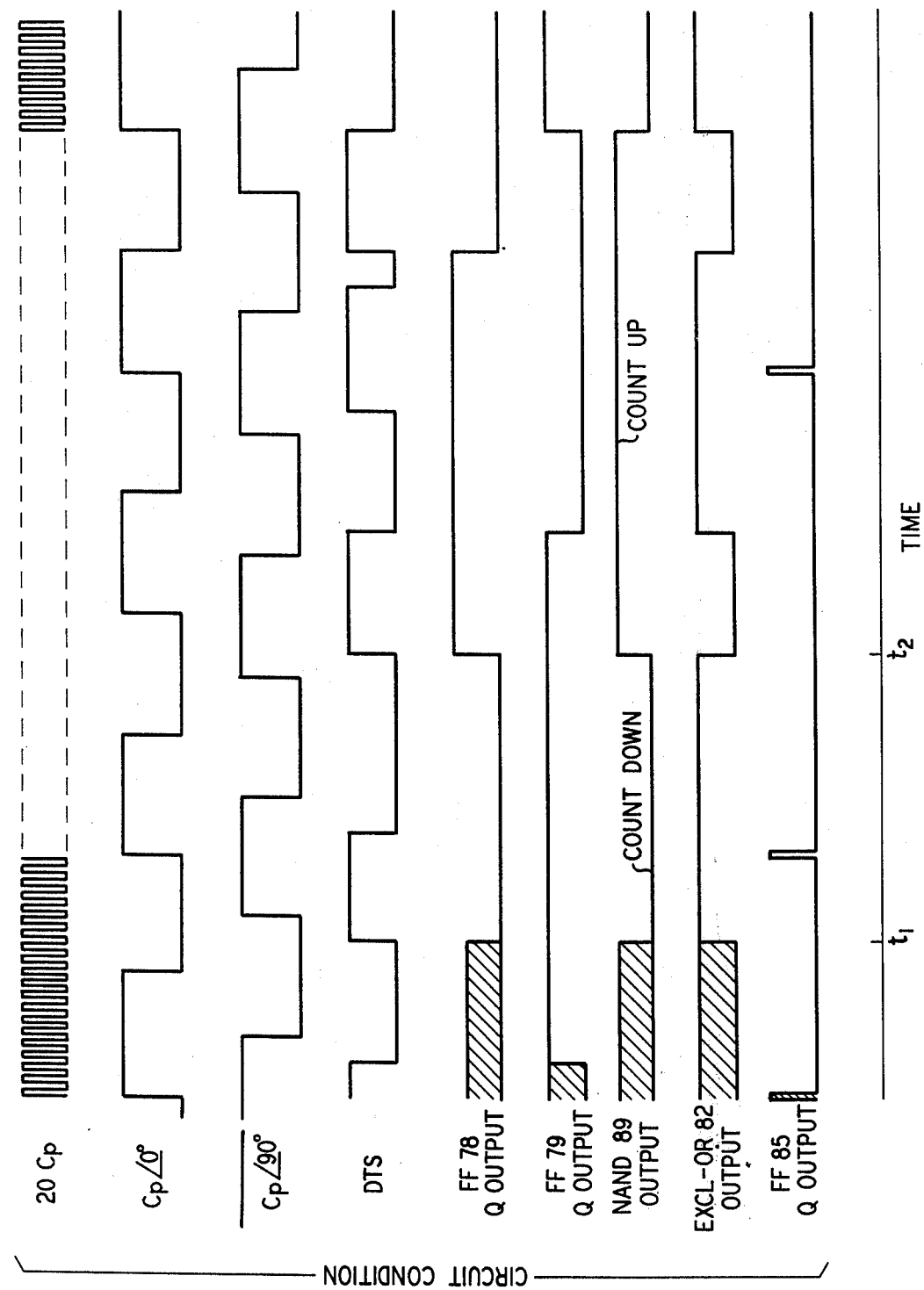
FIG. 5A is a set of timing wave diagrams illustrating the operation of a phase comparator used in FIG. 5.

Referring to FIG. 5A there is shown a set of timing diagrams drawn to a common time scale for illustrating an aspect of the operation of the comparator 77 whereby it allows counter 88 to operate in response to only a trend in the DTS signals. Shaded portions of some of the wave diagrams can be disregarded because they depend upon prior conditions not shown in FIG. 5A. It is of particular interest to note in FIG. 5A that the flip-flop circuit 78 samples the bit clock signal $\overline{Cp\ /90}$ on each positive-going leading edge of a DTS signal pulse. Similarly, the flip-flop circuit 79 samples the same bit clock signal on each negative-going transition of the DTS signal, i.e., on positive-going transitions of the $\overline{DTS}$ signal which is actually received but not shown in FIG. 5A. It can now be seen that the output of EXCLUSIVE OR circuit 82, which responds to Q outputs of both of those flip-flop circuits, is in a high signal condition only when the Q outputs of flip-flop circuits 78 and 79 differ; and it is in a low condition otherwise. Operation of the flip-flop circuit 85 in the brief sampling fashion previously described samples the illustrated output of EXCLUSIVE OR gate 82 to produce clock signals for the up-down counter 88. These clock signals at the output of flip-flop circuit 85 are shown at the bottom of FIG. 5A; and it can there be seen that in the center of the diagram, i.e., at the leading edge of the third pulse in the $Cp\ /0$ signal, there is no up-down clock pulse since at that time the output of the EXCLUSIVE OR gate 82 is low. Consequently, counter 88 ignores any direction command received on lead 90. EXCLUSIVE OR gate 82 assumed a low condition at that time because of some cause of uncertain origin which changed to DTS signal from a leading relationship to the $\overline{Cp\ /90}$ at time $t_1$ to a lagging relationship at time $t_2$. Consequently, immediately following time $t_2$ the Q outputs of flip-flop circuits 78 and 79 are in the same state and gate 82 produces a low output. The reason for changing from a leading to a lagging phase with respect to DTS may have been due to noise, or it may have been due to the information content of the received data, but it is uncertain as to which was the real cause. Consequently, the comparator 77 is adapted to ignore such changes until they become a trend, and the clock pulse output from the phase comparator is deleted to prevent counter 88 from taking action until the trend of direction control becomes clearer.

Still in FIG. 5A it is seen that the output of NAND gate 89 is low only when both of its inputs are high. This occurs only when flip-flop circuit 78 is in the reset state and flip-flop circuit 79 is in the set state. In that condition the output of gate 89 is low to provide a countdown command on the lead 90. Otherwise, the gate output is high to command an up count. Since the nature of the commmand changed at the time $t_2$, the following multivibrator 85 output pulse that would otherwise have occurred was deleted as has just been described; and clock pulses to counter 88 are not resumed until it is found that after one clock period of the signal $Cp\ /0$ the output of NAND gate 89 is still in the count-up condition. Thus, the counter 88 is allowed to operate only on a continuing trend of direction commands. If that trend is broken, counter operation is stopped until a new trend is seen in a high output of the EXCLUSIVE OR gate 82.

Up-down counter 88 is a commercially available reversible binary counter having the clocking and direct control inputs already mentioned. In addition, the Q outputs of the respective stages (numbering four in the illustrative embodiment) are coupled through interface logic 91 to inputs $P_0$, $P_1$ and $P_2$ of a variable ratio binary counter 92 for determining the frequency dividing ratio of that counter by fixing the count level to which it is forced in a resetting operation. As shown in FIG. 5 the least significant stage output of counter 88 is at the top, and the outputs are otherwise shown in order of increasing binary significance to the most significant stage output at the bottom. These outputs are otherwise designated $Q_A$ through $Q_D$. In addition the counter 88 has a presetting input PR which responds to a low level binary signal state for forcing the counter to its midrange count, i.e., to the count of 8, in the illustrative embodiment.

The interface logic 91 includes a NAND gate 95 having four input connections. One of these receives the positive-going counter clock pulses from inverter 87 on a lead 96. In addition the $Q_A$ and $Q_B$ outputs of counter 88 are coupled through inverters 97 and 98, respectively, to the gate 95. Also the $Q_C$ output of the counter is coupled directly to the latter gate. It will be seen then that gate 95 can be actuated only upon the coincidence of a clock pulse on lead 96 and a binary count condition of either 4 or 12 in the counter 88.

When thus enabled, gate 95 provides a low level signal to the $P_0$ input of variable ratio counter 92. In addition, a NAND gate 99 responds to the output of gate 95, after coupling through an inverter 94, and to the $Q_D$ output of counter 88 as coupled through an inverter 100. Thus, gate 99 receives a high enabling input from gate 95 only during count conditions 4 and 12 in counter 88. Similarly the inverted $Q_D$ output is high only for counts below the midrange count of 8. Consequently, gate 99 is actuated to produce a low output signal for only the count of 4. That low output signal is coupled through an inverter 101 to the $P_2$ input of counter 92, and is coupled directly to the $P_1$ input. The $P_3$ input is continuously actuated by a positive voltage from a grounded source 102.

Looking at the binary signal conditions at the presetting inputs for counter 92 in summary, they direct a frequent division by 6 in response to the count of 12 from counter 88, by 4 for the count of 4, and by 5 for all count levels greater than 4 and less than 12. A table follows which indicates these count conditions and division ratios in relation to the binary signal states at the presetting inputs of counter 92 and at the Q outputs of counter 88:

| COUNTER 88 COUNT | OUTPUT STATES OF AVERAGING UP/DOWN COUNTER 88 | | | | PRESET INPUT STATES TO VARIABLE RATIO COUNTER 92 | | | | |
| --- | --- | --- | --- | --- | --- | --- | --- | --- | --- |
| States | D | C | B | A | $P_3$ | $P_2$ | $P_1$ | $P_0$ | RATIO |
| 12 | 1 | 1 | 0 | 0 | 1 | 0 | 1 | 0 | (÷6) |
| 11 | 1 | 0 | 1 | 1 | 1 | 0 | 1 | 1 | |
| 10 | 1 | 0 | 1 | 0 | 1 | 0 | 1 | 1 | |
| 9 | 1 | 0 | 0 | 1 | 1 | 0 | 1 | 1 | |
| 8 | 1 | 0 | 0 | 0 | 1 | 0 | 1 | 1 | (÷5) |
| 7 | 0 | 1 | 1 | 1 | 1 | 0 | 1 | 1 | |
| 6 | 0 | 1 | 1 | 0 | 1 | 0 | 1 | 1 | |
| 5 | 0 | 1 | 0 | 1 | 1 | 0 | 1 | 1 | |
| 4 | 0 | 1 | 0 | 0 | 1 | 1 | 0 | 0 | (÷4) |

Interface logic 91 also includes a lead 103 which couples signals from the output of inverter 94 to an input of a further NAND gate 106 which supplies signals to the presetting input connection of counter 88. The lead 103 thus couples a low inhibiting signal to a gate 106 at all times except when counter 88 is in the counting states of 4 and 12. At those counts the lead 103 couples a high enabling signal which allows counter 88 to be reset when an additional high input signal is provided in a manner which will be described, by the low output of gate 110.

The variable ratio counter 92 can be any suitable presettable binary counter and one such counter is the commercially available integrated circuit counter chip 9316 DC of the Fairchild Corporation. Counter 92 is driven by the output of a stable crystal oscillator 107 operating at a frequency which is much higher than the bit rate of the broadband data signal received by the mobile unit under consideration. In the illustrative embodiment oscillator 107 operates at 10-megahertz for the system operating at a data rate of 10 kilobits per second. In this embodiment, counter 92 operating at its nominal division ratio of 5 normally produces a 2 megahertz signal at its overflow output lead 108. That signal is coupled through an inverter 109 and a NAND gate 110 to the aforementioned additional input of NAND gate 106. Consequently, each positive-going overflow pulse from counter 92 appears as a high input signal to gate 106 for actuating that gate when the counter 88 is in either the 4 or the 12 count condition. Upon actuation, gate 106 supplies a low level input signal to the presetting input of counter 88 to force the counter to its midrange count condition of 8.

The inverted overflow signal from the inverter 109 is also coupled by a lead 111 to an enable-load input of the counter 92. When the counter is so enabled it loads the binary signal information at its four presetting inputs $P_0$-$P_3$ which determines the initial level from which counter 92 operates in each cycle. Once so loaded the counter continues operation at its high rate, as compared to counter 88, and almost immediately resets the counter 88 to its midrange count condition if gate 106 had been enabled from inverter 94. That resetting takes place without the requirement for a clock pulse from the inverter 87. Consequently, a new, i.e., the nominal, frequency division ratio of five is specified by counter 88 and coupled through interface logic 91 to be available for loading at counter 92 the next time it overflows.

Since counter 88 can be reset from gate 106 only when it is at one of the counts of four or twelve, and since it always calls for division by five between those counts, the counter 92 cannot respond to relatively short-lived count changes in counter 88 until they have been accumulated to one of the two resetting count levels, or limits. The counter 92 usually does not operate through more than one overflow cycle at a time at a frequency division ratio other than 5 even under worst case conditions.

The output of NAND gate 110 is provided to a clock input connection for the fixed ratio binary counter 86. This counter provides the clock signals $20Cp$, $Cp \angle 0$, and $\overline{Cp} \angle 90$ as previously mentioned in connection with phase comparator 77. When the synchronizing signal recovery circuit 19 is being initialized, initialization pulses appearing on a lead 112 as previously outlined are applied to a resetting input connection of counter 86 and a preset input connection of counter 92. At this time the counter 86 is reset to a counting condition which will cause the $Cp \angle 0$ signal to occur simultaneously with data bit transitions in the received baseband data signal. In similar fashion, the counter 92 receives the initialization pulse at its master reset input and is thereby set to an initial count condition of zero for initializing purposes.

From that initialized condition, the FIG. 5 circuits are operated by the DTS signals applied to the phase comparator 77 which controls up-down counter 88 in response to trends in the signal rather than to every noise pulse. Counter 88 integrates the phase comparator output signal information for further removing some noise effects. This integrated information controls the division ratio of counter 92 for thereby effecting changes in the phase of the stable bit clock signal provided by the digital phase-locked loop. The circuit is inherently an extremely narrowband circuit and typically operates to maintain the output bit clock at 10 kilohertz in the illustrative embodiment within a range of ± 2.5 hertz. The employment of digital circuits throughout renders the phase-locked loop extremely stable even in the presence of wide changes in temperature, and yet it can be quickly initialized. Thus, its frequency stability has been found to be approximately 100 parts per million under conditions in which the best previously known phase-locked loop systems generally could maintain only about 250 parts per million at the 10 kilohertz output frequency, and those prior systems could not be initialized for fast pull-in.

Two forms of the bit clock signal are provided from output connections on counter 86 to the word synchronizing logic 35, and these are also available to other parts of the mobile unit. The $Cp \angle 0$ clock is extended on a lead 114 to logic 35, and an inverter 124 provides the $Cp \angle 90$ clock.

Figure 6A:
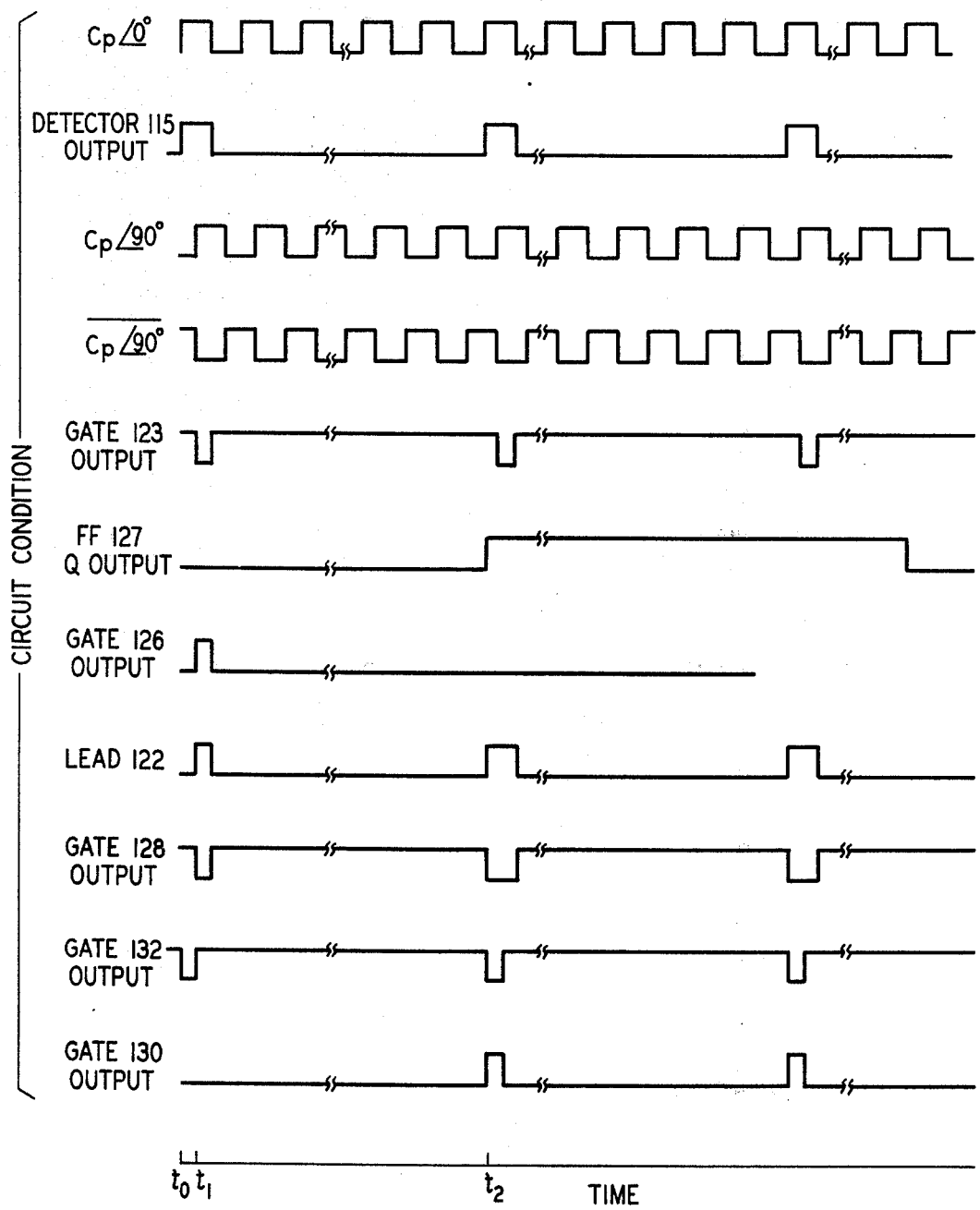
FIG. 6A is a set of timing wave diagrams illustrating the operation of word synchronizing logic in FIG. 6.

In FIG. 6 is a diagram of the word synchronizing logic 35, and FIG. 6A is a set of timing diagrams illustrating its operation. This logic receives bit rate clock inputs $Cp \angle 0$ and $Cp \angle 90$ from the clock acquisition circuit 40. In addition, a reset input and a gated NRZ input are provided from FIG. 4. The word synchronizing logic 35 produces an output in the form of a character indicator pulse on the lead 36 and word synchronizing pulses on an output lead 113.

Referring briefly to FIG. 4, in the data gating circuit 31, a low COV signal during reset initialization enables a NOR gate 140 to pass NRZ data from decoder 18 through to another NOR gate 141 that is then enabled by the low Q output of flip-flop 51 in reset control logic 30. The resulting output of gate 141 is passed by a NOR gate 142, if enabled by a controller voice-mode signal, to another NOR gate 143 to be coupled to the word synchronizing logic 35. After reset initialization the flip-flop 51 is set and gate 141 thereby blocked so the flow of NRZ data is stopped while the mobile unit is on a voice channel. It will be seen from subsequent consideration of FIG. 6 that this is sufficient for the present illustrative embodiment because in a data burst on a voice channel only a limited number, e.g., five, of words are required once word synchronization has been attained. When the controller signal indicates the continuous data mode, gate 142 is blocked, but the same signal coupled through an inverter 146 enables a NOR gate 147 to pass the NRZ data to gate 143 which is now enabled by the output of blocked gate 142.

The word synchronizing character, which follows a bit synchronization dotting sequence in the NRZ data, advantageously employs a so-called Barker sequence 11100010010 which is known in the art to have a small autocorrelation coefficient, and is therefore unlikely to appear in random data sequences or to be simulated in voice signals. This Barker sequence is detected by applying the gated NRZ form of the data to the data input of a 10-bit shift register 116 which is clocked by the bit rate signal $Cp \angle 0$. That shift register will not have been reset during a power-on reset initialization, but thereafter it is reset by a program reset coupled through a NAND gate 148 in FIG. 4 as a low level reset signal. In such a reset, register 116 goes to its all ZERO condition. The input NRZ data and the Q output of each of the ten stages of the shift register 116 are applied to inputs of respective EXCLUSIVE NOR gates 117, only five of which are shown in the drawing. Each of these EXCLUSIVE NOR gates has a further input connection from either a positive voltage source 118 or from ground; and those further inputs are applied so that when the correct ten bits of the Barker sequence are in the shift register 116, and the correct eleventh bit is available in the input to the register, all of the gates 117 produce high output signals. These high outputs actuate AND gates 119 which have their outputs all applied through yet another AND gate 120 of the Barker sequence detector 115. Thus, gate 120 produces a high output for only the one bit time that the full Barker sequence is in register 116. Such output of detector 115 is a synchronizing character indicator pulse. This character indicator pulse is, however, unreliable for data framing purposes since the NRZ signal is noisy and some Barker sequence characters may be missed or false characters may be indicated as a result of the noise. Consequently, the character indicator pulses are not directly employed as word synchronizing pulses. Instead, they are subjected to a form of filtering by digital circuits as will now be described.

A timing chain 121 is provided and comprises a binary counting circuit for counting the pulses of the bit clock signal $Cp \angle 0$. This timing chain is adapted to produce output pulses on a lead 122 at the same rate as is anticipated for word synchronizing character indicator pulses in a data message. Since a mobile radio telephone unit can operate on different types of channels requiring different character synchronizing rates, the controller 16 in FIG. 1 provides a mode signal. That signal is in the binary ONE state for operation on a voice channel where a data burst will appear only during a voice blanking period so the character synchronizing interval is relatively short. In the illustrative embodiment herein presented, that interval is advantageously 88-bit clock periods in duration. If the mode of operation is for a continuous data channel, i.e., a paging channel, a longer character synchronizing interval is advantageously employed; and in the illustrative embodiment an interval of 463-bit clock times is employed. The binary ONE or ZERO in this mode control signal is employed by logic not separately shown, but known in the art, to change the countdown ratio of the timing chain 121 accordingly. In one illustrative embodiment the chain 121 was formed of three Motorola Corporation type MC14526 programmable divide by N counters in a tandem counting connection.

A first positive-going character indicator pulse from Barker sequence detector 115 is applied at a time $t_0$ in FIG. 6A to one input of a NAND gate 123. When that pulse is in coincidence with a positive-going pulse in the $Cp \angle 90$ bit clock signal at a time $t_1$, a low NAND gate output signal enables a NOR gate 126 which has an additional low enabling input from the Q output of a flip-flop circuit 127. That flip-flop circuit is at this time, i.e., during synchronization of logic 35, in the reset state as will later become apparent. The high output signal produced by NOR gate 126 when fully enabled, as just mentioned, is applied at $t_1$ to a reset input connection of the timing chain 121 to reset that chain to a state from which it operates to produce an overflow pulse approximately one word synchronizing interval later at time $t_2$. The timing chain output will usually not have been in the overflow signal state just prior to the time of occurrence of the character indicator pulse. Consequently, prior to $t_1$, a low timing chain output on lead 122 is coupled by a NAND gate 128 as a high signal that is unable to clock a divide-by-5 counting circuit 129 and that blocks two NOR gates 130 and 131. However, in the process of the forced reset operation, timing chain 121 produces a brief positive-going output pulse at $t_1$ during the last half of the $Cp \angle 0$ clock pulse last applied to the timing chain. That chain output pulse has no serious effect because gate 131 is otherwise blocked at this time and counter 129 is advanced but soon reset at $t_2$ as will be described.

Indicator pulses from the Barker signal detector 115 are also applied to a NAND gate 132. That same gate also receives the $Cp \angle 90$ clock signal after inversion in a NAND gate 133 to produce the clock signal $\overline{Cp \angle 90}$. When a high signal in the latter timing signal is in coincidence with a character indicator pulse at the input to NAND gate 132, that gate produces a low output for enabling the NOR gate 130. It is noted at this point that this NOR gate 130 and the NOR gate 126 cannot be operated at the same time. Gates 130 and 126 are controlled by NAND gates 132 and 123, respectively. Gate 132 is operated in an interval, e.g., $t_0$-$t_1$, during the first one-quarter of a bit clock period in which timing chain 121 is clocked; and gate 123 is operated for the same length of time starting at time $t_1$. This use of different operating times has two advantages. It causes resetting of the chain 121 between actuations by $Cp \angle 0$-pulse leading edges so the chain never misses a count; and it also forces a low output of gate 132 to occur in a part of a $Cp \angle 0$ signal time $t_0$-$t_1$ when a low output of gate 128 cannot occur on a forced reset by a character indicator signal but that low output of gate 132 does occur on a natural recycling of chain 121, i.e., flip-flop 127 cannot be set to allow word synchronizing pulses to flow through gate 131 until two character indicator pulses have occurred one word synchronizing interval apart.

When the timing chain 121 attains its full count condition, the resulting high output signal on lead 122 is inverted to a low signal by gate 128 and applied to enable gates 130 and 131. The initial pulse of the type just mentioned occurred at a time $t_1$ during the first character indicator pulse from the Barker sequence detector 115 that coincided with a clock pulse and was coupled through gate 126 to reset timing chain 121. However, in the following timing chain cycle the chain overflows naturally in coincidence with the time $t_2$ that a second character indicator pulse from detector 115 should appear. Since gate 132 is clocked at that time, the indicator pulse actuates it to enable gate 130. The gate 130 is thus fully enabled and produces a high output pulse which sets the flip-flop circuit 127 and blocks a NOR gate 135 in a resetting feedback path for the divide-by-5 circuit 129. The blocking action forces the output of gate 135 low, thereby forcing the output of a NOR gate 137 high and resetting divide-by-5 circuit 129. That second character indicator pulse will also have been coupled through gates 123 and 126 for resetting the timing chain 121; but since it comes only one-quarter of a clock period after the resetting due to the natural overflow, it has no new effect on the chain. In addition, the output of gate 130 is applied on lead 36 as a filtered character indicator for restoring reset control logic 30.

Now with flip-flop circuit 127 in its set state, the high Q output thereof blocks gate 126 to prevent further resetting of the timing chain 121. That chain continues to operate and produce output pulses for driving the divide-by-5 circuit 129. Each such output pulse is now coupled through NOR gate 131 which is now enabled by the low $\overline{Q}$ output of flip-flop circuit 127 in its reset state. Consequently, each actuation in this fashion of NOR gate 131 by the timing chain 121 produces a word synchronizing pulse on lead 113.

In one implementation of the circuits of FIG. 6 the circuit used for divider 129 was subject to a race ambiguity if reset directly from its own output. Consequently, it is provided with a delayed-reset feedback that eliminates the race but resets divider 129 in time to avoid possible loss of any updating information from gates 128 and 130. During normal operation of the divide-by-5 circuit 129, prior to overflow thereof, its low $\overline{Q}$ output has no effect on a monostable multivibrator 136A connected in tandem with another monostable multivibrator 136B in a reset feedback loop. Consequently, the monostables provide a low output for enabling NOR gate 135. As a result, each high output from NOR gate 130, upon coincidence of a low signal from each of the NAND gates 128 and 132, produces a low output signal from gate 135. The latter signal is inverted by an inverter-connected NOR gate 137 to a high signal level and applied to the reset input of the divide-by-5 circuit 129 for resetting that circuit. It can now be seen that in normal operation each overflow pulse from the timing chain 121 produces a positive-going signal transition which clocks the divide-by-5 circuit 129. The same high signal from lead 122 is also coupled through an inverter 128 to the gate 130 where, assuming a low output from gate 132, the gates 135 and 137 are actuated for immediately resetting the circuit 129. Of course, if a character indicator pulse from the Barker sequence detector 115 does not appear in coincidence with overflow of the timing chain 121, the output of NAND gate 132 remains high and gate 130 remains blocked with a low output so that circuit 129 cannot be reset. When operated in this fashion, the circuit 129 counts successively missing character indicator pulses from the detector 115. If a few such pulses, i.e., less than five, occur in sequence, monostable multivibrator 136A is not operated and gate 135 remains enabled. However, in the absence of high outputs from NOR gate 130, the divide-by-5 circuit 129 is not reset and the misses are counted. In the meantime, gate 131 continues to supply word synchronizing pulses to lead 113.

If five character indicator pulses are missed in sequence, the divide-by-5 circuit 129 attains full count and produces a low-to-high signal transition at that time. The monostable multivibrator 136A is triggered by that transition; and its low $\overline{Q}$ output after time-out triggers monostable multivibrator 136B which produces a high Q output that blocks the gate 135 for the duration of the cycle time of the monostable. The effect of this is to force the output of that gate to the low condition to be inverted by gate 137 to a high signal level, and thereby hold a reset signal on the divide-by-5 circuit 129 for the duration of the cycle time of the monostable multivibrator 136B. The entire resetting operation takes about four periods of clock signal $Cp \angle 0$ so it is completed well before timing chain 121 could produce a further output that requires counting.

When the divide-by-5 circuit 129 overflowed, its high Q output was coupled to reset flip-flop circuit 127 for restarting the synchronizing operation for detector 115 and timing chain 121. The high $\overline{Q}$ output of the flip-flop 127 blocks NOR gate 131 to interrupt the flow of word sync pulses, and the low Q output enables the gate 126 so that subsequent character indicator pulses can reset the timing chain 121 for establishing synchronism in the manner already described.

Thus, word synchronizing pulses are supplied from the timing chain 121. That pulse supply has a flywheel-type of operation which enables the flow of word synchronizing pulses to continue on with uninterrupted high precision even though a few synchronizing characters may be missed by the detector 115 because of noise in the NRZ data. Nevertheless, if too many such indicator pulses are missed, the circuits of FIG. 6 are automatically reset to search anew for the synchronized condition. Furthermore, the circuits of FIG. 6 have a bit-timing-signal-controlled filtering type of function which causes the circuits of FIG. 6 to find and hold word synchronization with minimal response to false character indicator pulses produced by detector 115 as a result of noise in the received data signal.

Although the present invention has been described in connection with a particular embodiment thereof, additional applications, modifications, and embodiments which will be apparent to those skilled in the art are included within the spirit and scope of the invention.

What is claimed is:

1. In a synchronizing signal recovery circuit for a receiver for data signals having a predetermined word rate, a predetermined bit rate,, and a predetermined synchronizing character rate,
    means for indicating the presence of a predetermined synchronizing character in the data signal,
    a circuit for deriving an approximate bit rate timing signal from the data signals,
    means, responsive to the timing signal, for producing a substantially stable clock signal at the bit rate of the data signal, and
    means, responsive to the stable bit rate clock signal and the character indicating means output, for initiating the production of a train of word synchronizing pulses only after the occurrence of at least two of the indicating pulses in coincidence with the stable bit clock pulses, successive ones of the indicating pulses being spaced by only a word synchronizing time interval of the data signal.

2. The synchronizing signal recovery circuit in accordance with claim 1 in which the stable clock producing means includes
    a digital phase-locked loop responsive to the approximate bit rate timing signal for producing the bit rate clock signal, and
    further means responsive to the approximate bit rate timing signal for initializing the digital phase-locked loop to operate at a predetermined phase relationship with respect to said data signals.

3. The synchronizing signal recovery circuit in accordance with claim 2 in which the digital phase-locked loop comprises
    a phase comparing means having a first input connection for receiving said approximate bit rate timing signal,
    means for digitally integrating the output of said phase comparing means,
    a source of pulses at a pulse repetition rate which is much higher than the rate of said bit rate timing signal,
    a variable-division-ratio counter driven by said pulse source and having the division ratio thereof fixed by the output of said digital integrating means,
    means for counting pulses from the output of said variable-division-ratio counter to produce a pulse train at the frequency of said approximate bit rate timing signal, and
    means for coupling the output of said counting means to a further input connection of said phase comparing means.

4. The synchronizing signal recovery circuit in accordance with claim 3 in which said phase comparing means comprises
    first and second bistable flip-flop circuits,
    means for applying said approximate timing signal in true and complement phases for clocking said first and second flip-flop circuits, respectively, to sample said pulse train,
    means for performing an EXCLUSIVE OR logic function on first outputs of said first and second flip-flop circuits, said first outputs both exhibiting the same true binary signal state when their respective flip-flop circuits are in the same stable state,
    means for sampling the output of said EXCLUSIVE OR performing means to provide clock signals for said digital integrating circuit,
    means for performing a NAND logic function on a complement output of said first flip-flop circuit which is actuated by the true form of said approximate timing signal and said first output of said second flip-flop circuit, and
    means for coupling an output of said NAND performing means to said digital integrating circuit for controlling the operation thereof to increment in response to a first output binary state of said NAND performing means and decrement in response to a second binary output state thereof, whereby said phase comparing means inhibits a change in state of operation of said digital integrating circuit in response to a direction command which is different from the immediately preceding direction command.

5. The synchronizing signal recovery circuit in accordance with claim 3 in which said phase comparing means comprises
    first and second sampling means, responsive to different phases, respectively, of said approximate timing signal, for sampling said pulse train,
    means, responsive to said sampling means, for controlling the direction of operation of said digital integrating means, and
    means responsive to a coincidence of different signal state outputs of said first and second sampling means for supplying clock signals to operate said digital integrating means.

6. The synchronizing signal recovery circuit in accordance with claim 3 in which said digital integrating means comprises
    a reversible binary counter,
    means for actuating said reversible binary counter in a first direction in response to a first binary output state of said phase comparing means and in a second direction in response to a second binary state output of said phase comparing means, and
    means for coupling bit-parallel output signals from the respective stages of said binary counter to said variable ratio counter as a digital multibit character having a first value for a first count condition of said binary counter, a second value for a second but higher count condition of said binary counter, and a third value for a plurality of count conditions between said first and second count conditions.

7. The synchronizing signal recovery circuit in accordance with claim 3 in which said variable-division-ratio counter comprises
  means, responsive to a full count condition in said variable-division-ratio counter, for loading into such counter division ratio fixing signals from said digital integrating means, and
  additional means responsive to a full count in said variable-division-ratio counter for resetting said digital integrating means to a digital signal condition representing an intermediate level of the integrating range for such integrating means.

8. The synchronizing signal recovery circuit in accordance with claim 3 in which said digital integrating circuit comprises
  a reversible binary counter driven by said phase comparing means, and
  interface logic circuits for coupling bit-parallel outputs of said reversible counter to control the frequency dividing ratio of said variable ratio counter, said interface logic means comprising
  means for pulsing a first division ratio control input of said variable ratio counter in response to a coincidence of a clock pulse for actuating said reversible counter, a first binary state at the two least significant stages of said reversible counter, and a second binary state at a third least significant stage of said reversible counter,
  means for pulsing a second ratio control input of said variable ratio counter in response to coincidence of said first binary state in a most significant bit stage of said reversible counter and the absence of a pulse at said first ratio counter input,
  means for pulsing a third ratio control input of said variable ratio counter with signals which are the complement of those applied as aforesaid to said second ratio control input, and
  means responsive to the absence of a pulse at said first ratio control input in coincidence with an overflow of said variable ratio counter for resetting said reversible counter.

9. The synchronizing signal recovery circuit in accordance with claim 3 in which said digital integrating circuit comprises
  a reversible binary counter driven by said phase comparing means,
  means for coupling bit-parallel outputs of said reversible counter to control the frequency dividing ratio of said variable ratio counter,
  means for driving said variable ratio counter at a rate much higher than that at which said reversible counter is driven,
  means for resetting said reversible counter to a predetermined one of its intermediate count conditions in response to each overflow of said variable ratio counter, and
  means responsive to said coupling means for inhibiting said resetting means in response to a plurality of intermediate count conditions, including said one count condition, of said reversible counter.

10. The synchronizing signal recovery circuit in accordance with claim 1 in which the means for deriving an approximate timing signal comprises
  means for limiting the data signals to remove spurious signal excursions,
  means for full-wave rectifying the output of the limiting means for generating a signal having a frequency component at twice the bit rate of said data signal,
  means for bandpass filtering the output of said rectifying means in a band having a center frequency at said data bit rate, said filtering means having a relatively low Q and a relatively low phase sensitivity to temperature variations, and
  means for detecting zero crossings in the output of said filtering means to produce said approximate bit rate timing signal.

11. The synchronizing signal recovery circuit in accordance with claim 1 which comprises in addition
  means for limiting said baseband data signal,
  means for bandpass filtering the output of said limiting means in a band having a center frequency at approximately one-half of said data bit rate and at a relatively high Q for effecting a narrowband filtering operation,
  means for full-wave rectifying the output of said bandpass filtering means for generating a signal having a frequency component which is approximately twice the center frequency of said filtering means,
  means for low-pass filtering an output of said rectifying means with a cutoff frequency at approximately the center frequency of said filtering means for deriving an output signal having an amplitude which is approximately the average amplitude of the output of said rectifying means, and
  means for comparing the output of said low-pass filtering means to a reference voltage which is representative of the lowest acceptable average signal amplitude generally signifying the presence of a dotting signal in said data signal, said comparing means producing a high level output voltage signal if the low-pass filtering output is below the threshold and a low level output voltage if it is above the threshold.

12. The synchronizing signal recovery circuits in accordance with claim 11 which comprises in addition means for generating a set of initializing pulses for initializing said stable clock signal producing means, said generating means comprising
  a monostable trigger circuit,
  means for applying said comparing means output voltage level to enable said trigger circuit,
  means responsive to said approximate timing signal for triggering said monostable trigger circuit once in response to each cycle of said approximate timing signal,
  means for coupling an output of said monostable trigger circuit to said stable clock signal producing means,
  means for inhibiting the output of said trigger circuit for a plurality of word synchronizing time intervals of said baseband data signal after the procedure of said set of initializing pulses from said trigger circuit, and
  means responsive to an output of said initiating means for inhibiting the application of said comparator output voltage level signal to said trigger circuit.

13. The synchronizing signal recovery circuits in accordance with claim 11 in which there are provided means for controllably gating said data signals to said synchronizing character indicating means, and
  means responsive to said low level comparing means output voltage for enabling said gating means.

14. The synchronizing signal recovery circuit in accordance with claim 1 in which said synchronizing character indicating means comprises
- a shift register clocked in response to said stable bit clock signal,
- plural EXCLUSIVE NOR gates each having a first input connection coupled to receive signals from a different stage output of said shift register,
- an additional EXCLUSIVE NOR gate having a first input connection for receiving said data signals,
- means for biasing a second input of each of said EXCLUSIVE NOR gates so such gate produces a high output when its input is in the correct binary signal state for its ordered position in said synchronizing character, and
- means responsive to outputs of all of said EXCLUSIVE NOR gates for producing a single output pulse in response to actuation of all of said gates upon the entry of said synchronizing character into said shift register.

15 The synchronizing signal recovery circuit in accordance with claim 1 in which said word synchronizing pulse train initiating means comprises
- means, responsive to said stable bit clock signal, for producing output pulses at said synchronizing character rate,
- means, responsive to coincidence of a synchronizing character indicating pulse and a stable bit clock pulse, for resetting said output pulse producing means to a starting operating condition from which it produces another such output pulse one synchronizing character interval later,
- means, responsive to each output pulse from said output pulse producing means, for producing a word synchronizing pulse, and
- means, responsive to coincidence of a synchronizing character indicating pulse with both a stable bit clock pulse and an output producing means pulse, for inhibiting said resetting means and enabling said word synchronizing pulse producing means.

16. The synchronizing signal recovery circuit in accordance with claim 15 in which said word synchronizing pulse train initiating means further comprises
- means for counting output pulses from said output pulse producing means,
- means responsive to the last-mentioned pulse coincidence for resetting said counting means, and
- means responsive to attainment of a predetermined count level in said counting means for disabling said inhibiting means and thereby forcing resynchronization of said output pulse producing means with said synchronizing character indicating means.

17. The synchronizing signal recovery circuit in accordance with claim 16 in which said word synchronizing pulse train-initiating means further comprises
- means for controllably changing said predetermined word synchronizing time interval duration defining operation of said output pulse producing means.

18. In a synchronizing signal recovery circuit for a receiver for a data signal having a predetermined synchronizing character rate and a predetermined bit rate, frequency components corresponding to said rates being hidden because said data signal is immersed in noise,
- means for receiving a pulse train at said bit rate,
- means for generating a pulse train at said synchronizing character rate,
- means for resetting said generating means on each coincidence of a synchronizing character and a pulse in said bit rate pulse train,
- means for producing data word synchronizing pulses in response to pulses in said character rate pulse train, and
- means for inhibiting said resetting means and enabling said producing means on coincidence of a synchronizing character with both a pulse in said bit rate pulse train and a pulse in said character rate pulse train.

19. A digital phase comparator comprising
- input connections for receiving first and second input signals of variable phase difference to be compared in phase,
- means for generating a pulse train at the frequency of one of said signals, and
- means for inhibiting the first pulse of said train after each change in the sign of the phase difference between said first and second signals.

20. In combination,
- means for deriving from a noisy data signal an approximate timing signal, said timing signal having predetermined recurrent bit time intervals,
- a digital phase-locked loop having an input connected for receiving said approximate timing signal, and
- means for initializing said digital phase-locked loop in one bit time interval to a predetermined phase relationship with said approximate timing signal.

21. A digital phase-locked loop comprising
- a comparator having connections for receiving first and second input signals, means for generating a pulse train at the frequency of one of said signals, and means for inhibiting the first pulse of said train after each change in the sign of a phase difference between said first and second signals,
- clocked digital integrating means clocked by said pulse train and controlled in direction of operation by an output of said comparator indicating said phase difference polarity,
- a variable-division-ratio counter having means for driving said counter at a rate much higher than the pulse repetition rate in said train,
- means, responsive to the output of said integrating means, for controlling the division ratio of said counter,
- means, responsive to each overflow from said counter, for setting said integrating means at a predetermined intermediate level of operation thereof, and
- means responsive to the overflow output of said counter for producing said second input signal.

22. The digital phase-locked loop in accordance with claim 21 in which said controlling means comprises
- means for directing a first division ratio in response to a first integrating means integration value,
- means for directing a second division ratio in response to a second integrating means integration value,
- means for directing a third division ratio in response to a plurality of integrating means integration values, said plurality of values all being intermediate between said first and second values, and
- means responsive to said first and second values, for inhibiting said setting means except while said integrating means is at such values.

23. A digital phase-locked loop comprising means for comparing the phases of first and second input signals, means for digitally integrating the output of said comparing means, means, responsive to a change in state of the output of said comparing means, for inhibiting operation of said integrating means for a predetermined time interval, means for providing a train of pulses of variable phase, means, responsive to an output of said integrating means, for varying the phase of said pulse train, and means, responsive to said pulse train, for providing said second input signal.

24. The combination in accordance with claim 20 in which said initializing means comprises means, responsive to a predetermined frequency component in said noisy data signal and less than a bit rate corresponding to said bit time interval, for generating an initialization pulse of one bit time interval duration, and means, responsive to said initialization pulse for setting said phase-locked loop to a predetermined phase relationship with respect to said approximate timing signal.

25. The combination in accordance with claim 20 in which said deriving means comprises analog means for producing a pulse train at the bit rate of said data signal and including the phase information of said data signal, and said initializing means comprises analog means for detecting the presence, in at least a predetermined amplitude, of a dotting sequence in said noisy data signal, means for producing at least one initialization pulse in response to coincidence of detection of said dotting sequence and a pulse of said pulse train, and means, responsive to said initialization pulse, for setting said loop to a predetermined phase relationship with respect to said approximate timing signal.

* * * * *

UNITED STATES PATENT AND TRADEMARK OFFICE
CERTIFICATE OF CORRECTION

PATENT NO. : 4,029,900
DATED : June 14, 1977
INVENTOR(S) : Eric J. Addeo

It is certified that error appears in the above-identified patent and that said Letters Patent are hereby corrected as shown below:

Column 6, line 17, "sgnal" should read --signal--. Column 10, line 57, "work" should read --word--. Column 11, line 34, "updown" should read --up-down--. Column 12, line 8, "to" should read --the--. Column 12, line 30, "commmand" should read --command--. Column 19, line 26, "rate,," should read --rate,--. Column 22, line 56, "procedure" should read --production--.

Signed and Sealed this

Eighteenth Day of April 1978

[SEAL]

Attest:

RUTH C. MASON
Attesting Officer

LUTRELLE F. PARKER
Acting Commissioner of Patents and Trademarks